(12) United States Patent
Taniguchi et al.

(10) Patent No.: US 8,912,906 B2
(45) Date of Patent: Dec. 16, 2014

(54) SIGNAL PROCESSING CIRCUIT AND ANTENNA APPARATUS

(75) Inventors: Katsumi Taniguchi, Nagaokakyo (JP); Noboru Kato, Nagaokakyo (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 363 days.

(21) Appl. No.: 13/229,814

(22) Filed: Sep. 12, 2011

(65) Prior Publication Data

US 2012/0001701 A1   Jan. 5, 2012

Related U.S. Application Data

(63) Continuation of application No. PCT/JP2010/054247, filed on Mar. 12, 2010.

(30) Foreign Application Priority Data

Mar. 13, 2009   (JP) .................................. 2009-060429

(51) Int. Cl.
 *G08B 13/14* (2006.01)
 *H01Q 11/08* (2006.01)
 *G06K 7/00* (2006.01)
 *H04B 5/00* (2006.01)
 *H01Q 9/27* (2006.01)
 *H01Q 7/00* (2006.01)

(52) U.S. Cl.
 CPC ............. *H04B 5/0062* (2013.01); *H01Q 11/08* (2013.01); *G06K 7/0008* (2013.01); *H01Q 9/27* (2013.01); *H01Q 7/00* (2013.01)
 USPC ................... 340/572.7; 340/572.4; 340/572.5

(58) Field of Classification Search
 USPC .............. 340/572.7, 572.4, 572.5, 10.1, 10.3, 340/10.4; 333/5
 See application file for complete search history.

(56) References Cited

U.S. PATENT DOCUMENTS

| 7,014,103 | B2* | 3/2006 | Fernandez | ..................... 235/375 |
| 7,333,786 | B2* | 2/2008 | Kikuchi et al. | ............... 455/130 |
| 2003/0134612 | A1 | 7/2003 | Nakayama et al. | |
| 2005/0087599 | A1* | 4/2005 | Ward et al. | ..................... 235/451 |
| 2005/0125093 | A1 | 6/2005 | Kikuchi et al. | |
| 2008/0197710 | A1* | 8/2008 | Kreitz et al. | ................... 307/104 |

FOREIGN PATENT DOCUMENTS

| EP | 1 976 056 A1 | 10/2008 |
| JP | 2001-358514 A | 12/2001 |
| JP | 2005-244848 A | 9/2005 |

(Continued)

OTHER PUBLICATIONS

Official Communication issued in International Patent Application No. PCT/JP2010/054247, mailed on Jun. 15, 2010.
Karibe, "Extremely Understandable Book on Non-contact IC Card (provisional English title)", Nikkan Kogyo Shimbun Publishing, Apr. 20, 2008, p. 89.
Official Communication issued in corresponding Japanese Patent Application No. 2011-503881, mailed on Mar. 5, 2013.

(Continued)

*Primary Examiner* — Toan N Pham
(74) *Attorney, Agent, or Firm* — Keating & Bennett, LLP

(57) ABSTRACT

To form a signal processing circuit and an antenna apparatus that do not need a circuit to adjust resonant frequency of a resonant circuit or resonant-frequency adjustment work and that are downsized, an antenna coil and a capacitor define an antenna resonant circuit. An impedance matching circuit including capacitors, a first coil, and a second coil is provided between the antenna resonant circuit and a wireless IC. The first coil and the second coil are magnetically coupled.

9 Claims, 7 Drawing Sheets

(56) References Cited

FOREIGN PATENT DOCUMENTS

| | | |
|---|---|---|
| JP | 2007-103477 A | 4/2007 |
| JP | 2007-274026 A | 10/2007 |
| JP | 2008-148345 A | 6/2008 |
| JP | 3148168 U | 2/2009 |
| JP | 2009-302580 A | 12/2009 |
| WO | 2008/149946 A1 | 12/2008 |

OTHER PUBLICATIONS

Official Communication issued in corresponding Chinese Patent Application No. 201080011719.5, mailed on May 26, 2014.
Official Communication issued in corresponding Japanese Patent Application No. 2013-140956, mailed on May 7, 2014.
English Translation of Official Communication issued in corresponding Japanese Patent Application No. 2013-140956, mailed on May 7, 2014.

\* cited by examiner

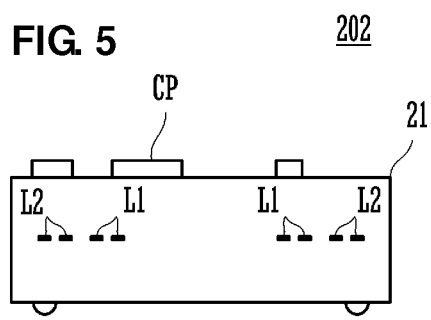
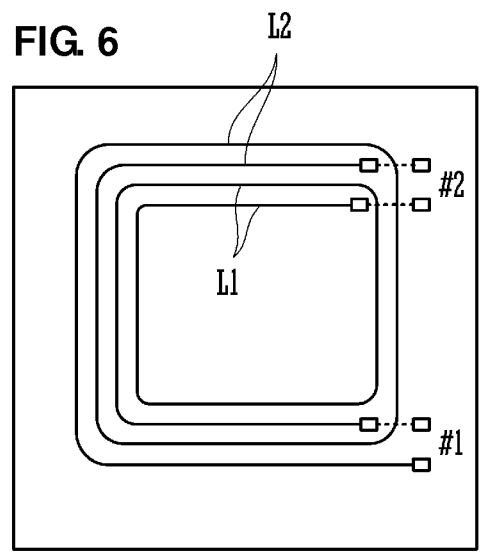

SIGNAL PROCESSING CIRCUIT AND ANTENNA APPARATUS

BACKGROUND OF THE INVENTION

1. Field of the Invention

The present invention relates to a signal processing circuit for use in a wireless IC device to perform non-contact communications using, for example, near-electromagnetic field, such as an RFID, and an antenna apparatus.

2. Description of the Related Art

Hiroshi Karibe, "Extremely Understandable Book on Non-contact IC Card (provisional English title)," Nikkan Kogyo Shimbun Publishing, 2008/04/20, page 89 (hereinafter referred to as "Karibe"), discloses a reader for a non-contact IC card used as an RFID.

FIG. 1 shows an equivalent circuit of the reader for a non-contact IC card disclosed in Karibe. This non-contact IC card is a reader that communicates with non-contact IC cards in a non-contact manner. An antenna resonant circuit AR composed of an antenna coil AL, equivalent resistors R11 and R12 corresponding to the Q value of the antenna coil, and a capacitor C0 is formed in a manner corresponding to a wireless IC 11.

Capacitors C1 and C2 and inductors L1 and L2 are provided in order to match impedances between the wireless IC 11 and the antenna resonant circuit AR. A diode bridge DB is provided as a detector circuit, and capacitors C31, C32, C41, and C42 are provided as a smoothing circuit.

Adjustment of the capacitor C0 within the antenna resonant circuit AR allows adjustment of the resonant frequency of the antenna resonant circuit AR, ensuring a favorable communication state.

However, in such a wireless IC device for performing non-contact communications using near-electromagnetic field, variations in the inductance of the antenna coil or in the capacitance of the capacitor change the resonant frequency of the antenna resonant circuit. Further, depending on the ambient environment of the apparatus in which the wireless IC device (in particular, the antenna coil) is incorporated, the resonant frequency of the antenna resonant circuit deviates from the specified value. For this reason, there has been a need to form the capacitor C0 shown in FIG. 1 using a trimmer capacitor so as to adjust the resonant frequency of the antenna resonant circuit to the specified value for each device.

For example, in the case where this wireless IC device is used in mobile phone terminals, an antenna apparatus or wireless IC device must be prepared for each of a plurality of extremely diverse devices. In the case where adjustment work is required for each apparatus, a large number of man-hours are unfavorably required, resulting in an increase in cost.

Further, the balanced terminals of the wireless IC 11 require the inductors L1 and L2, respectively. Furthermore, the two inductors, L1 and L2, are required to have both a low direct-current resistance and a high direct-current superimposition characteristic (the allowable value of the direct current). This prevents downsizing of the device. For example, a current of several hundred mA or more passes through the inductors L1 and L2. For this reason, the inductors L1 and L2 are formed using coils that are much larger than other constituent elements, thus preventing downsizing of the device.

The above-mentioned problems apply to apparatuses including a wireless IC, as well as apparatuses including a high-frequency circuit having balanced terminals. The same goes for apparatuses including an antenna resonant circuit, as well as apparatuses including a high-frequency circuit having balanced terminals and a resonant circuit.

SUMMARY OF THE INVENTION

Accordingly, preferred embodiments of the present invention provide a signal processing circuit and an antenna apparatus that do not need a circuit to adjust the resonant frequency of a resonant circuit or resonant-frequency adjustment work and that are downsized.

A signal processing circuit according to a preferred embodiment of the present invention preferably is a signal processing circuit connected to a high-frequency circuit including two terminals and includes two coils that are connected to the two terminals of the high-frequency circuit and are magnetically coupled to each other.

The two coils cause signals at the two terminals, for example, to be approximately 180° out of phase with each other.

The two terminals are, for example, balanced terminals that output or receive balanced signals. The two coils are connected in series with the balanced terminals of the high-frequency circuit, respectively.

The two terminals are, for example, balanced terminals that output or receive balanced signals. The two coils include a first coil connected to the balanced terminal of the high-frequency circuit and a second coil magnetically coupled to the first coil. For example, the two coils are magnetically coupled to each other such that the coils strengthen magnetic flux with each other.

If the two coils have an identical coil axis and are aligned in the direction of the coil axis, the two coils can be reliably magnetically coupled to each other.

If the two coils are provided on a plane and one of the two coils is disposed inside the other coil, the two coils can be coupled with a high degree of coupling.

The two coils preferably have an identical inductance. Thus, the advantages obtained by the coupling between the two coils are maximized, obtaining a high gain in a wider frequency band.

If the two coils are provided, for example, on a multilayer substrate including a magnetic substance, the two coils having a predetermined inductance can further be downsized. Further, if at least a portion of a circuit electrically connected to the two coils is disposed on or within the multilayer substrate, the entire apparatus can be downsized and slimmed.

In an antenna apparatus according to a preferred embodiment of the present invention, the high-frequency circuit is a wireless IC for use in a wireless IC device for communicating with an external device wirelessly. The signal processing circuit is included in an impedance matching circuit connected between an antenna resonant circuit and the balanced terminals, the antenna resonant circuit including an antenna coil to transmit or receive signals to or from the external device wirelessly.

Since the two coils keep signals at the balanced terminals of the high-frequency circuit approximately 180° out of phase with each other over a wide frequency band, a high gain can be obtained over the wide frequency band.

Further, even when the resonant frequency of the antenna resonant circuit itself deviates from the specified value somewhat, impedances can be matched between the antenna resonant circuit and the wireless IC. This eliminates the need for a circuit to adjust the resonant frequency of the antenna resonant circuit, such as a trimmer capacitor, as well as the need for resonant-frequency adjustment work.

The above and other elements, features, steps, characteristics and advantages of the present invention will become more apparent from the following detailed description of the preferred embodiments with reference to the attached drawings.

BRIEF DESCRIPTION OF THE DRAWINGS

FIGS. 4A and 4B are Smith charts showing the impedance in the case where the two coils are seen from two transmission terminals shown in FIG. 2, wherein FIG. 4A illustrates characteristics in the case where the coupling coefficient of the two coils shown in FIG. 2 is about 0.9, and FIG. 4B illustrates characteristics in the case where the coupling coefficient is about 0.00001, for example.

FIG. 5 is a sectional view of a main portion of a wireless IC device according to a second preferred embodiment of the present invention.

FIG. 6 is a drawing showing the configuration of two coils located within the wireless IC device according to the second preferred embodiment of the present invention.

DETAILED DESCRIPTION OF THE PREFERRED EMBODIMENTS

First Preferred Embodiment

Figure 1:
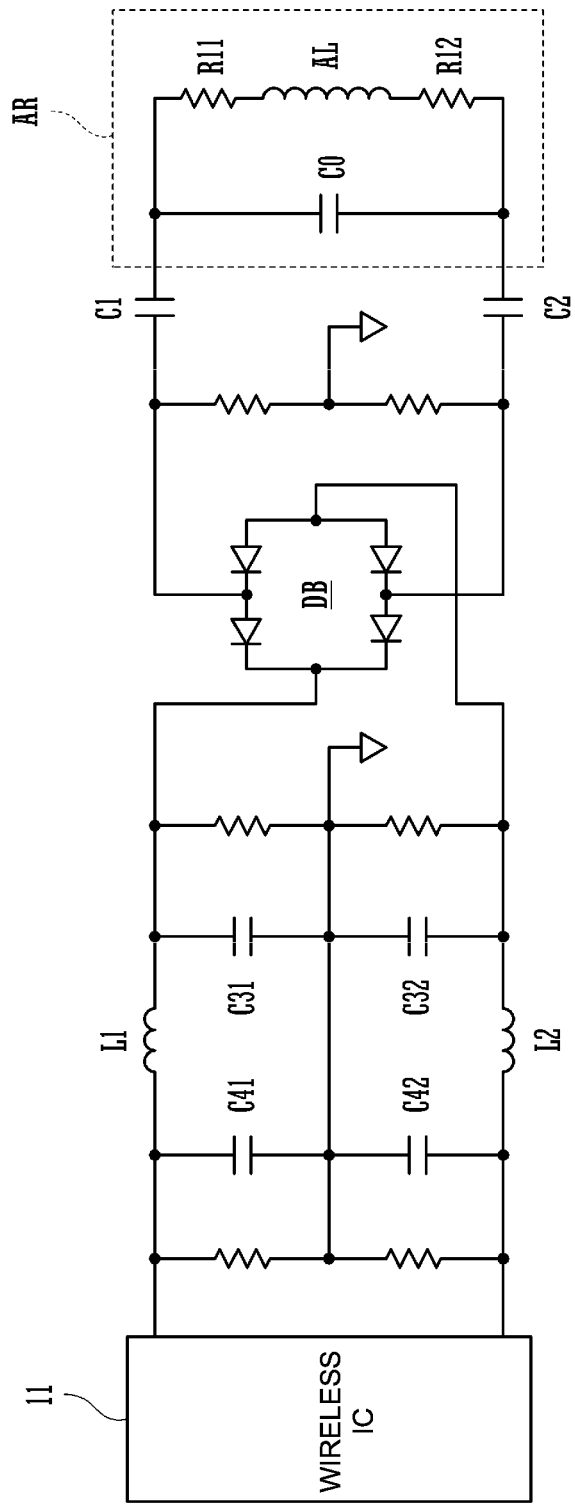
FIG. 1 is an equivalent circuit of a conventional reader for use in a non-contact IC card.
Figure 2A:
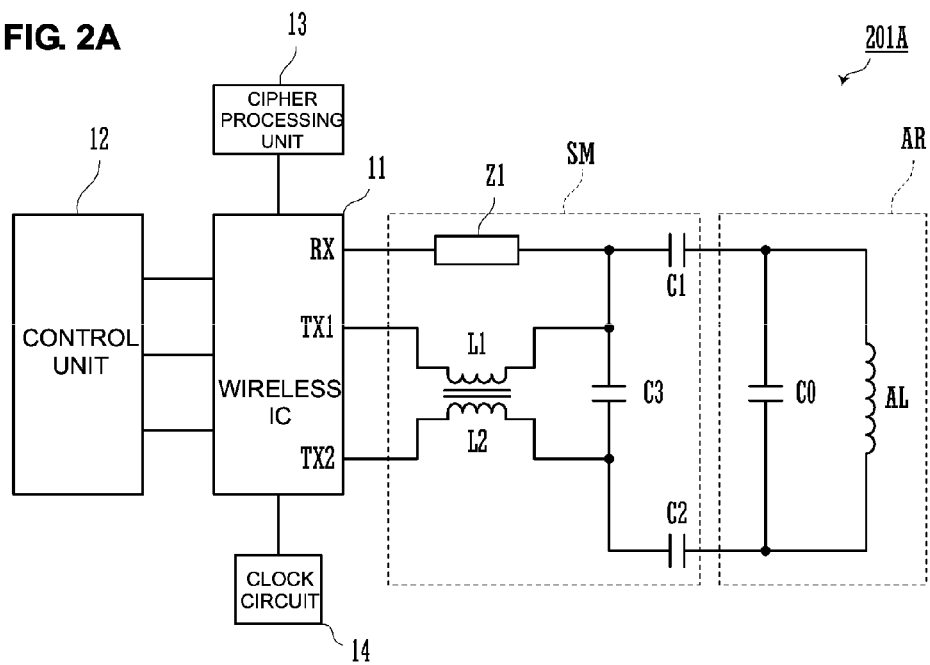
FIG. 2A is a circuit diagram of a wireless IC device 201A according to a first preferred embodiment of the present invention.
Figure 2B:
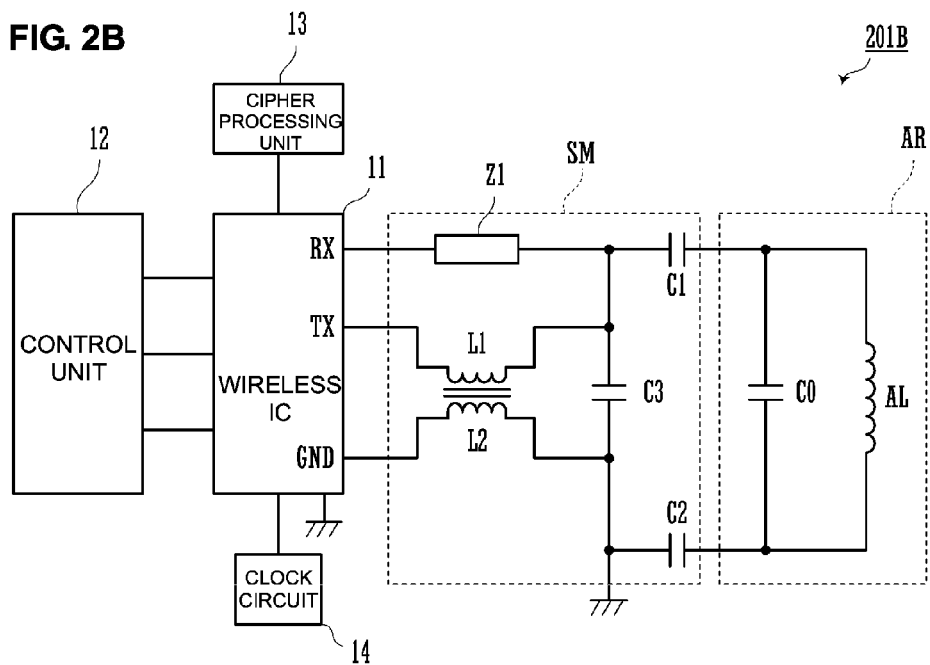
FIG. 2B is a circuit diagram of another wireless IC device according to the first preferred embodiment of the present invention.

FIG. 2A is a circuit diagram of a wireless IC device 201A according to a first preferred embodiment of the present invention. FIG. 2B is a circuit diagram of another wireless IC device, 201B, according to the first preferred embodiment of the present invention.

First, FIG. 2A will be described. As shown in FIG. 2A, an antenna coil AL and a capacitor CO define an antenna resonant circuit AR.

The wireless IC device 201A includes the antenna resonant circuit AR, a wireless IC 11, a control unit 12, a cipher processing unit 13, and a clock circuit 14. A characteristic stabilization circuit SM to perform impedance matching is preferably provided between the antenna resonant circuit AR and the wireless IC 11. The characteristic stabilization circuit SM corresponds to a "signal processing circuit" according to a preferred embodiment of the present invention. Specifically, a series circuit of capacitors C1, C2, and C3 is connected in parallel with the antenna resonant circuit AR. A first coil L1 is connected between a first transmitting terminal TX1 of the wireless IC 11 and the connection point between the capacitors C1 and C3. A second coil L2 is connected between a second transmitting terminal TX2 of the wireless IC 11 and the connection point between the capacitors C2 and C3.

The first coil L1 and the second coil L2 preferably have an identical inductance. The first coil L1 and the second coil L2 are magnetically coupled such that the coils strengthen magnetic flux with each other. An impedance element Z1 is connected between a receiving terminal RX of the wireless IC 11 and the connection point between the capacitors C1 and C3. The impedance element Z1 is, for example, a capacitor.

The first coil L1, the second coil L2, and the three capacitors, C1, C2, and C3, match impedances between the two transmitting terminals, TX1 and TX2, of the wireless IC 11 and the antenna resonant circuit AR.

The capacitors C1, C2, and C3 and the impedance element Z1 match impedances between the receiving terminal RX of the wireless IC 11 and the antenna resonant circuit AR.

The wireless IC 11 outputs square wave signals of 13.56 MHz from the balanced transmitting terminals TX1 and TX2. The square wave signals drive the antenna resonant circuit AR via the two coils, L1 and L2, and the three capacitors, C1, C2, and C3 so that a magnetic field of 13.56 MHz is emitted from the antenna coil AL. If an RFID tag is adjacent to the antenna coil AL, the RFID tag receives the magnetic field signal and thus receives power, as well as changes the impedance of its internal wireless IC on the basis of its own ID so as to change the impedance of its antenna resonant circuit (ASK modulation). Thus, the RFID returns its ID by reflection of energy.

The wireless IC 11 receives a signal generated by the ASK modulation and returned by the reflection and decrypts the ID. In the case where the wireless IC 11 transmits data or a command, it ASK modulates a drive voltage (current) of 13.56 MHz. The RFID tag receives the data or command from the wireless IC 11 by decrypting a variation in strength of a received carrier wave.

The control unit 12 receives or outputs various types of data or commands for control from or to the wireless IC 11. The clock circuit 14 provides clock signals to the wireless IC 11. The cipher processing unit 13 performs a process with respect to a cipher to be used by the RFID.

FIG. 2B is an example configuration where transmission signals are outputted from unbalanced terminals. In FIG. 2B, a terminal TX is a transmission signal output terminal, and a terminal GND is a ground terminal. The other configuration is the same as what is shown in FIG. 2A. As seen, the transmission signal output terminals of the wireless IC 11 may be unbalanced terminals.

Figure 3:
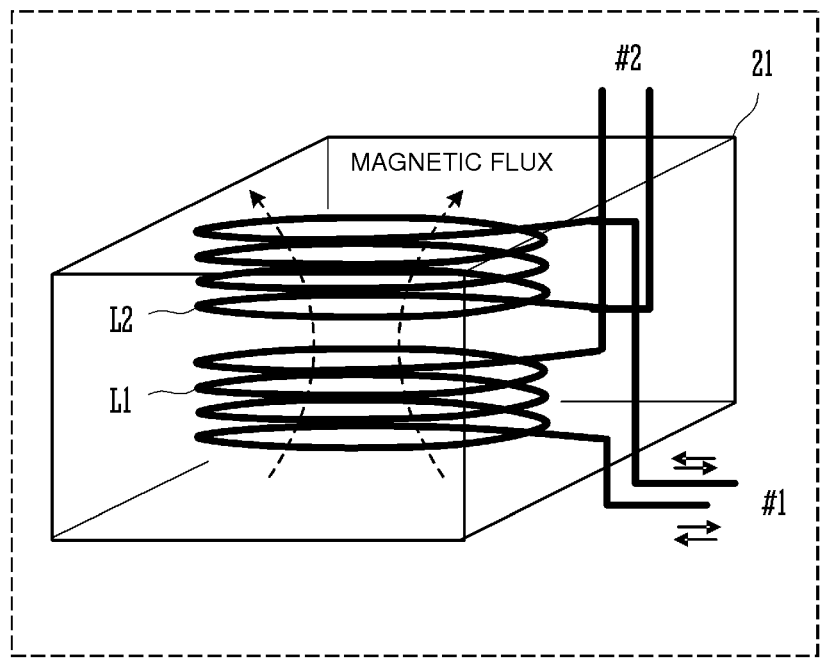
FIG. 3 is a drawing showing the configuration of two coils included in the wireless IC device according to the first preferred embodiment of the present invention.

FIG. 3 is a drawing showing the configuration of portions of the coils L1 and L2. The two coils, L1 and L2, are provided within a magnetic substrate 21 made of ferrite. The coils L1 and L2 have an identical coil axis and are aligned in the direction of the coil axis. The coils L1 and L2 are magnetically coupled.

In FIG. 3, a port #1 is connected to the antenna resonant circuit AR, and a second port #2 is connected to the wireless IC.

Figure 4A:
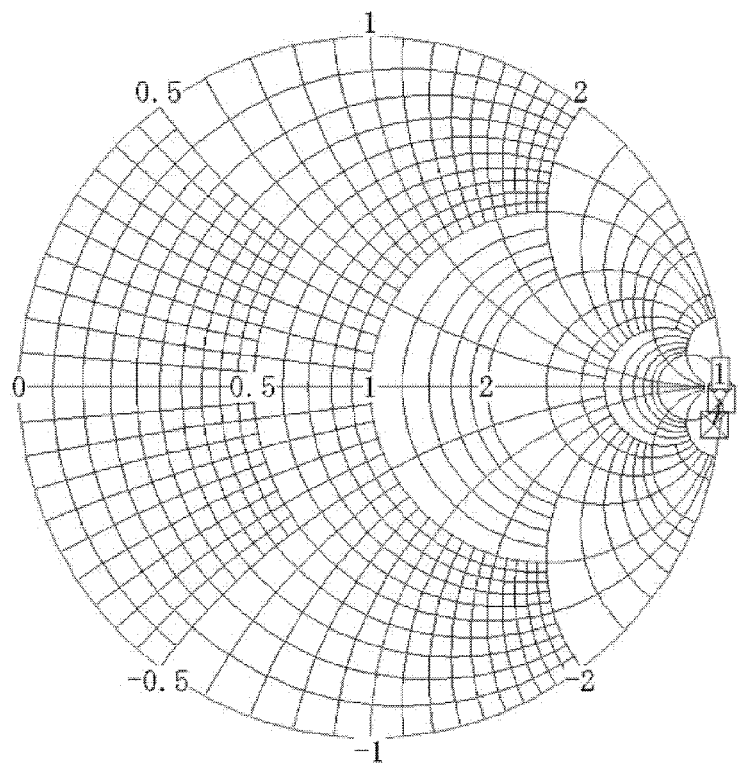

FIG. 4A is a Smith chart showing the impedance (S11 of S parameter) in the case where the two coils, L1 and L2, are seen from the two transmission terminals, TX1 and TX2, of the wireless IC 11 shown in FIG. 2.

Figure 4B:
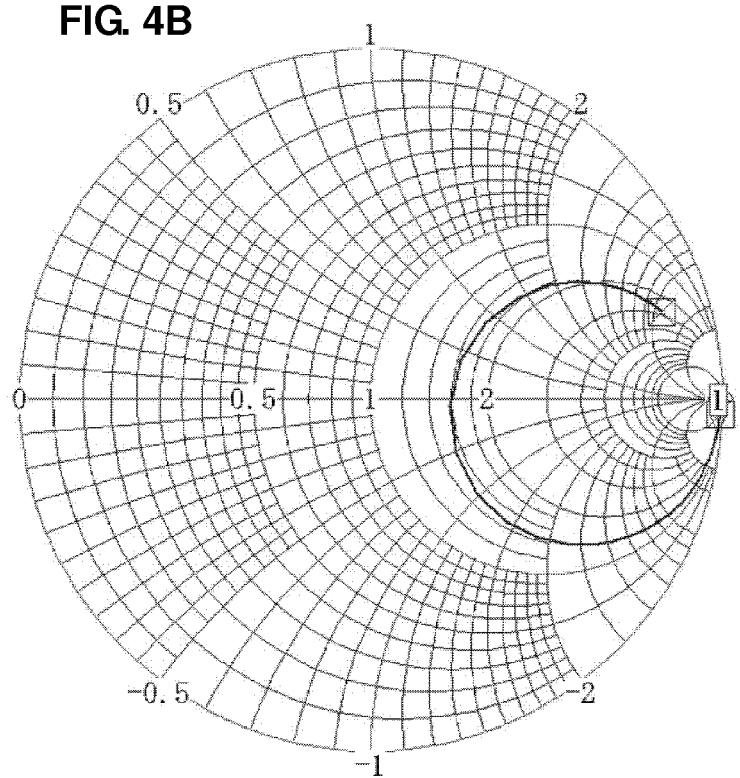

FIG. 4A illustrates characteristics in the case where the coupling coefficient of the two coils, L1 and L2, shown in FIG. 2 is about 0.9, for example. FIG. 4B illustrates characteristics in the case where the coupling coefficient is about 0.00001, for example. When the frequency sweeps from 8.56 MHz to 18.56 MHz in the case where the coupling coefficient between the two coils, L1 and L2, is approximately zero, the impedance locus is significantly displaced from the right edge (infinite impedance) of the Smith chart clockwise, as shown in FIG. 4B. In contrast, when the frequency sweeps from 8.56 MHz to 18.56 MHz in the case where the two coils, L1 and L2, are coupled, the impedance locus is hardly displaced. This is because the coupling between the coils L1 and L2 keeps signals at the two transmission terminals, TX1 and TX2, of the wireless IC 11 approximately 180° out of phase with each other. That is, it is understood that balance characteristics can be obtained in the frequency band of 8.56 MHz to 18.56 MHz. Thus, impedances are reliably matched between the antenna resonant circuit AR and the wireless IC 11 over the wide frequency band, preventing a reduction in gain due to the deviation of the resonant frequency of the antenna resonant circuit AR. This eliminates the need for a circuit to adjust the resonant frequency of the antenna resonant circuit, such as a trimmer capacitor, as well as the need for resonant-frequency adjustment work. This eliminates the need for work such as adjustment of the resonant frequency of the antenna resonant circuit to a specified value for each device, for example, regardless of the ambient environment of the apparatus in which the wireless IC device (in particular, antenna coil) is incorporated.

Further, the two coils are magnetically coupled in such a manner that the coils strengthen magnetic flux with each other. This doubles the amount of magnetic flux passing through each coil, doubling the equivalent inductance of each coil. This can halve the number of coil windings required to obtain necessary inductance, halving direct-current resistance. Halving of the number of coil windings allows downsizing of the device.

In contrast, if the two coils are magnetically coupled such that the coils weaken magnetic flux with each other, currents pass through the coils in the opposite directions. Thus, signals can easily be made approximately 180° out of phase with each other without having to design the inductance value.

Second Preferred Embodiment

FIG. 5 is a sectional view of the main portion of a wireless IC device 202 according to a second preferred embodiment. FIG. 6 is a drawing showing the configuration of two coils, L1 and L2, provided within the wireless IC device 202. The circuit configuration of the wireless IC device is similar to that according to the first preferred embodiment shown in FIG. 2.

In the example shown in FIG. 6, the two coils, L1 and L2, are preferably arranged to have a spiral configuration, for example. The first coil L1 is disposed inside the second coil L2 on approximately the same plane. A port #1 is connected to an antenna resonant circuit AR side, and a second port #2 is connected to a wireless IC side. The disposition of one coil, L1, inside the other coil, L2, as described above can strengthen the coupling between the two coils, L1 and L2, reliably matching impedances.

As shown in FIG. 5, the two coils, L1 and L2, shown in FIG. 5 are preferably provided in approximately the same plane within the magnetic substrate 21 made of ferrite. Chip components CP, such as capacitors to perform impedance matching (C1, C2, and C3 shown in FIG. 2) and a capacitor C0 for an antenna resonant circuit, are mounted on the upper surface of the magnetic substrate 21.

The wireless IC 11, the control unit 12, the cipher processing unit 13, the clock circuit 14, and the like shown in FIG. 2 may be mounted on the upper surface of or within the magnetic substrate 21. This allows formation of a module (RFID module) including the wireless IC chip, facilitating incorporation into the wireless IC device.

Third Preferred Embodiment

Figure 7A:
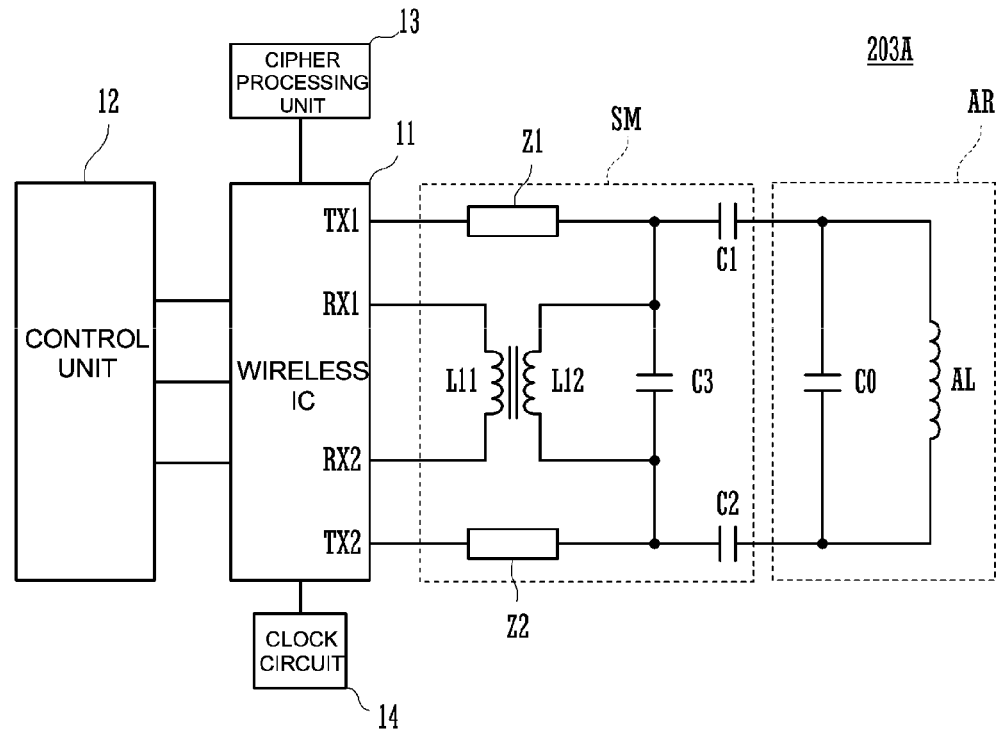
FIG. 7A is a circuit diagram of a wireless IC device according to a third preferred embodiment of the present invention.
Figure 7B:
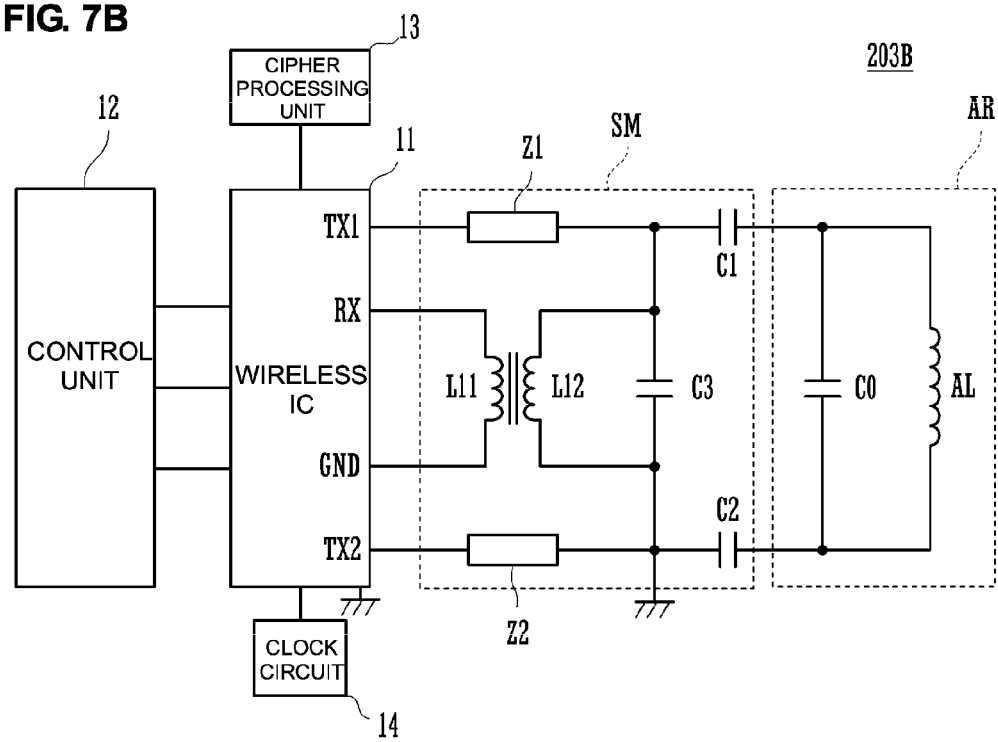
FIG. 7B is a circuit diagram of another wireless IC device according to the third preferred embodiment of the present invention.

FIG. 7A is a circuit diagram of a wireless IC device 203A according to a third preferred embodiment of the present invention. FIG. 7B is a circuit diagram of another wireless IC device, 203B, according to the third preferred embodiment of the present invention.

First, FIG. 7A will be described. As shown in FIG. 7A, the wireless IC device 203A includes an antenna resonant circuit AR, a wireless IC 11, a control unit 12, a cipher processing unit 13, a clock circuit 14, and a characteristic stabilization circuit SM to match impedances between the wireless IC 11 and the antenna resonant circuit AR. The characteristic stabilization circuit SM has a configuration different from that according to the first preferred embodiment shown in FIG. 2. Another difference is that the wireless IC 11 includes receiving terminals RX1 and RX2, which are balanced inputs.

Both end portions of a first coil L11 are connected to the two receiving terminals, RX1 and RX2, of the wireless IC 11. Both end portions of a second coil L12 are connected to both end portions of a capacitor C3. The first coil L11 and the second coil L12 are magnetically coupled to each other.

In the third preferred embodiment, "the two coils" according to a preferred embodiment of the present invention are applied to the balanced input terminals RX1 and RX2 of the wireless IC 11.

Impedance elements Z1 and Z2 for impedance matching are connected between transmitting terminals TX1 and TX2 of the wireless IC 11 and both end portions of the capacitor C3. The two impedance elements, Z1 and Z2, are, for example, inductors (coils). As seen, the present invention is applicable not only to transmission signals, which are propagated between the wireless IC 11 and the antenna resonant circuit AR, but also to reception signals.

Further, in the example shown in FIG. 7A, the two coils, L11 and L12, are connected in parallel with the balanced signal lines propagated between the balanced input terminals RX1 and RX2 and the antenna resonant circuit AR. As seen, the two coils (L11 and L12) according to a preferred embodiment of the present invention may be connected in parallel with the balanced signal lines propagated between the wireless IC and the antenna resonant circuit AR.

The parallel connection of the two coils can eliminate the influence of static electricity from the antenna resonant circuit, preventing electrostatic breakdown of the wireless IC.

FIG. 7B is an example configuration where reception signals are inputted into unbalanced terminals. In FIG. 7B, a terminal RX is a reception signal input terminal, and a terminal GND is a ground terminal. The other configuration is the same as what is shown in FIG. 7A. As seen, the coil according to the present invention may be applied to the unbalanced reception signal terminals.

Fourth Preferred Embodiment

Figure 8:
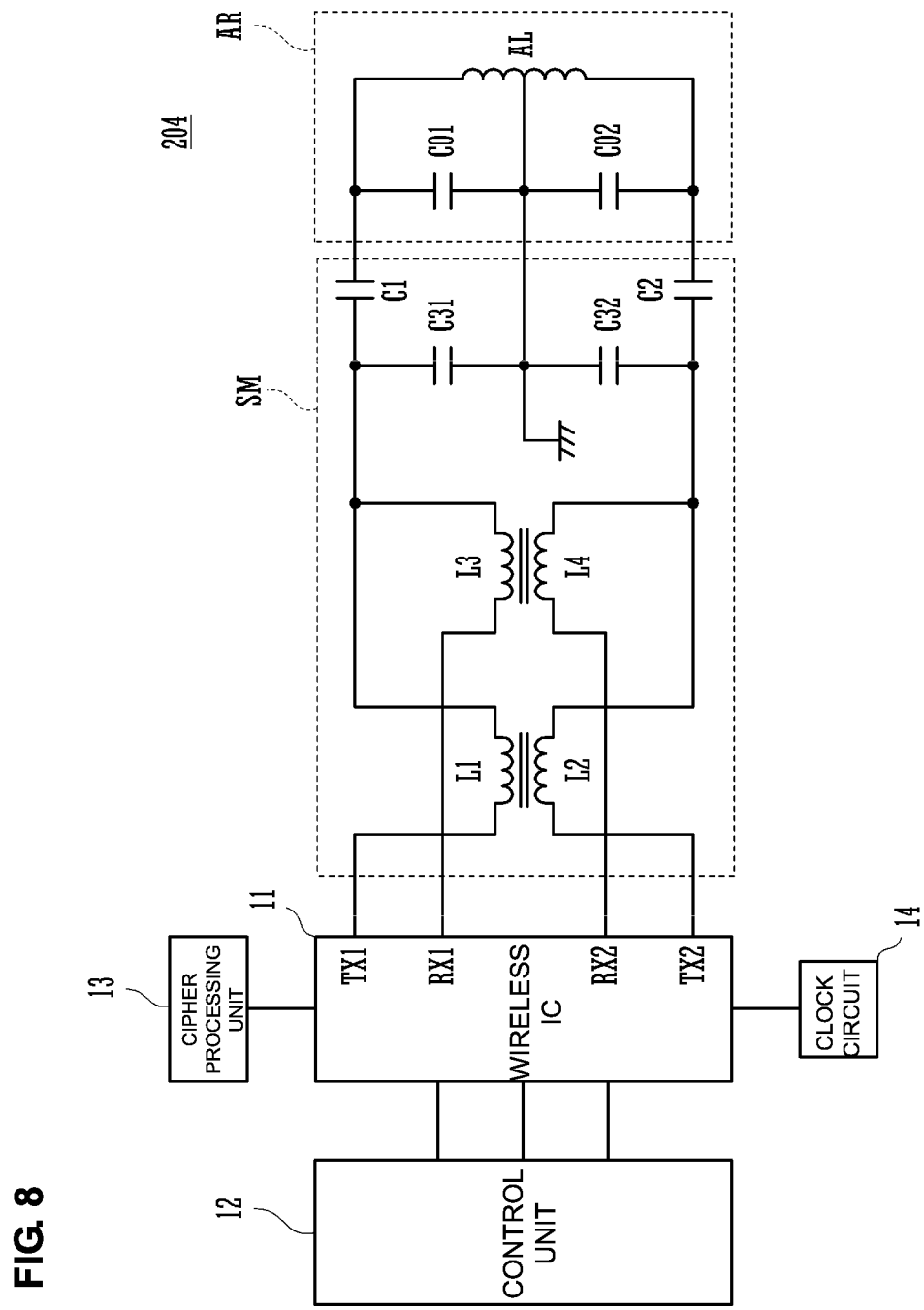
FIG. 8 is a circuit diagram of a wireless IC device according to a fourth preferred embodiment of the present invention.

FIG. 8 is a circuit diagram of a wireless IC device 204 according to a fourth preferred embodiment of the present invention. In the example shown in FIG. 8, a characteristic stabilization circuit SM, which matches impedances between two transmitting terminals (balanced output terminals), TX1 and TX2, of a wireless IC 11 and an antenna resonant circuit AR, includes two coils, L1 and L2. Similarly, an impedance matching circuit between two receiving terminals (balanced input terminals), RX1 and RX2, of the wireless IC 11 and the antenna resonant circuit AR includes two coils, L3 and L4.

Further, in the example shown in FIG. 8, in order to ground the neutral point (zero volt line) of balanced signals that are propagated between the antenna resonant circuit AR and the wireless IC 11, the antenna resonant circuit AR includes a series circuit of two capacitors, CO1 and CO2, having the same capacitance, and the connection point between the capacitors CO1 and CO2 and the center of the antenna coil AL are grounded. The impedance matching circuit also includes a series of capacitors C31 and C32, and the connection point between these capacitors is grounded.

The stabilization of the potential of the neutral point as described above can prevent the deviation from zero volt of balanced signals within the wireless IC 11, stabilizing the operation.

While, in the above-mentioned preferred embodiments, the circuit including the antenna resonant circuit preferably includes the characteristic stabilization circuit, a circuit including a high-frequency circuit for inputting or outputting balanced signals and a resonant circuit may include the characteristic stabilization circuit. That is, the characteristic stabilization circuit may be provided between the high-frequency circuit and the resonant circuit. Thus, even when the resonant frequency of the resonant circuit deviates from the specified value somewhat, impedances can be matched between the resonant circuit and the high-frequency circuit. This eliminates the need for a circuit to adjust the resonant frequency of the resonant circuit, such as a trimmer capacitor, as well as the need for resonant-frequency adjustment work.

While, in the above-mentioned preferred embodiments, the circuit including the wireless IC preferably includes the characteristic stabilization circuit, the characteristic stabilization circuit may be provided between a circuit for inputting or outputting balanced signals and a transmission line. This allows halving of the number of coil windings, halving direct-current resistance as well as downsizing the apparatus.

Particularly, in circuits including an antenna resonant circuit that emits magnetic fields, coils are connected to two terminals that receives or outputs signals with a frequency lower than the resonant frequency of an antenna resonant circuit. Accordingly, signals at the two terminals readily become, for example, 120° or 160° out of phase with each other. On the other hand, the signal processing circuit according to the present invention includes the two coils that are magnetically coupled to each other, allowing signals at the two terminals to become approximately 180° out of phase with each other.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. An antenna apparatus, comprising:
   a wireless IC configured to be used in a wireless IC device to perform wireless communication with external equipment and including a first input/output terminal and a second input/output terminal;
   an antenna resonance circuit including an antenna coil configured to transmit and receive a signal by the wireless communication with the external equipment, one end of the antenna coil being connected to the first input/output terminal, and another end of the antenna coil being connected to the second input/output terminal; and
   an impedance matching circuit including a portion that is connected between the first and second input/output terminals of the wireless IC and the antenna resonance circuit, the portion of the impedance matching circuit including:
   a first coil connected between the first input/output terminal and the one end of the antenna coil; and
   a second coil connected between the second input/output terminal and the another end of the antenna coil, and magnetically coupled to the first coil; wherein
   the first and second coils are magnetically coupled to each other such that the first and second coils strengthen a magnetic flux with each other.

2. The antenna apparatus according to claim 1, wherein the first and second two coils are configured to cause signals at the first and second input/output terminals to be approximately 180° out of phase with each other.

3. The antenna apparatus according to claim 1, wherein the first and second input/output terminals are balanced terminals that output or receive balanced signals, and the first and second coils are connected in series with the balanced terminals.

4. The antenna apparatus according to claim 1, wherein the first and second input/output terminals are balanced terminals that output or receive balanced signals.

5. The antenna apparatus according to claim 1, wherein the first and second coils have an identical coil axis and are aligned in a direction of the coil axis.

6. The antenna apparatus according to claim 1, wherein the first and second coils are located on a plane, and one of the first and second coils is disposed inside the other of the first and second coils.

7. The antenna apparatus according to claim 1, wherein the first and second coils have an identical inductance.

8. The antenna apparatus according to claim 1, wherein the first and second coils are provided on a multilayer substrate comprising a magnetic substance.

9. The antenna apparatus according to claim 8, wherein at least a portion of a circuit electrically connected to the first and second coils is disposed on or within the multilayer substrate.

* * * * *